Aug. 25, 1931.  W. M. PIGGOTT  1,820,826
HEAT DISTRIBUTOR
Filed March 3, 1930
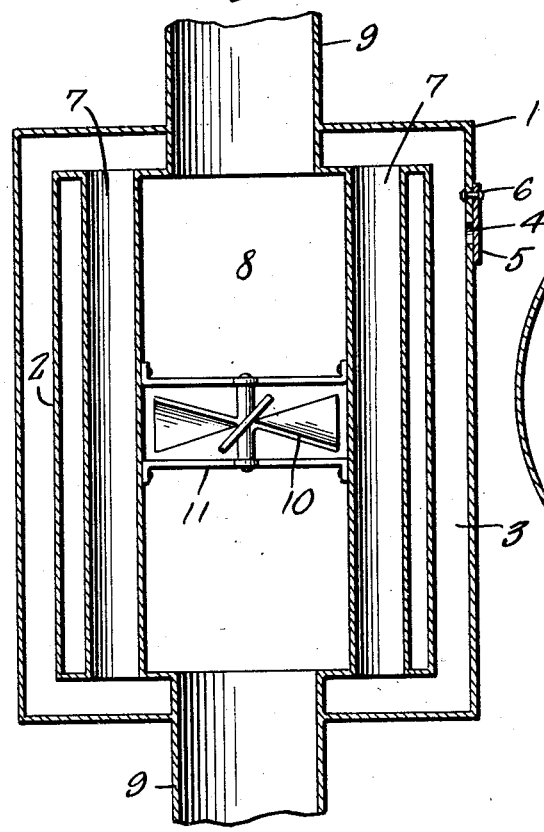
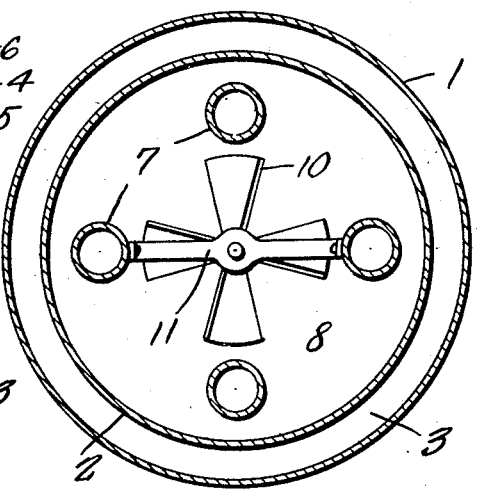
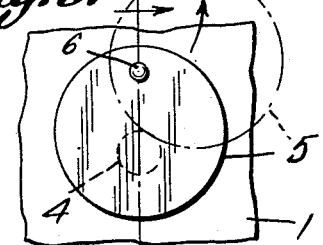
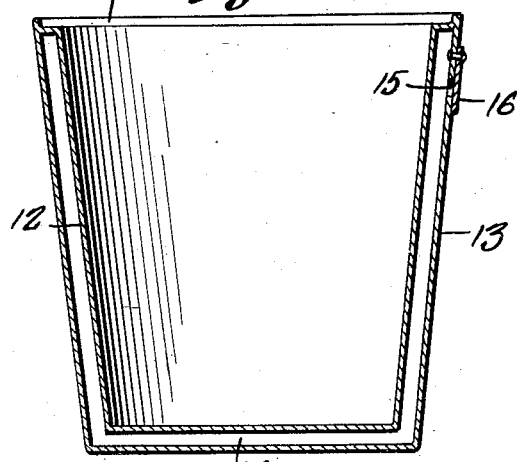
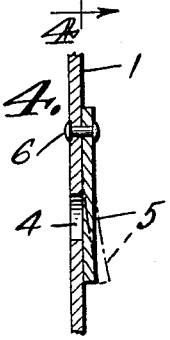
Warren M. Piggott,
INVENTOR
BY Victor J. Evans
ATTORNEY
WITNESS:

Patented Aug. 25, 1931

1,820,826

UNITED STATES PATENT OFFICE

WARREN M. PIGGOTT, OF LEAVENWORTH, KANSAS

HEAT DISTRIBUTOR

Application filed March 3, 1930. Serial No. 432,357.

This invention relates to new and useful improvements in heat distributors and has for its primary object the provision of a device of the above stated character especially adapted to thoroughly and evenly heat air, fluids, food stuffs and any other materials by vapor or steam from water, mercury, oil and any other fluid.

Another object of this invention is the provision of inner and outer receptacles providing between the same a sealed chamber having means to permit the placing of desired kinds of heating fluids therein to cast off vapor, or steam to evenly heat all walls of the inner receptacle and said means adapted to automatically permit the escape of the steam or vapor at a predetermined temperature or pressure.

A further object of this invention is the provision of a heat distributor of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a vertical sectional view illustrating a heat distributor constructed in accordance with my invention.

Figure 2 is a transverse sectional view illustrating the same.

Figure 3 is a fragmentary side elevation illustrating the steam or vapor control.

Figure 4 is a sectional view taken on the line 4—4 of Figure 3.

Figure 5 is a vertical sectional view illustrating the application of my invention to a cooking utensil or the like.

Referring in detail to the drawings, the numeral 1 indicates an outer receptacle in which is positioned an inner receptacle 2 spaced from the outer receptacle to form a heating chamber 3. The receptacles 1 and 2 are secured together in any well known manner or may be formed integrally to form the chamber 3 into an air-tight compartment and the receptacle 1 is provided with an opening 4 to permit a fluid such as water, mercury, oil, etc., to be placed in the chamber 3 and it is to be understood that the fluid is placed therein, in the desired amount to cast off steam or vapor when heated, to permit the steam or vapor to thoroughly and evenly heat the walls of the inner receptacle. It is to be understood that the receptacle 1 is associated with a suitable heating source, (not shown) which may be separate from the receptacle 1 or as a part thereof. A disk 5 is pivoted to the receptacle 1 as at 6 and normally overlies and closes the opening 4 and has frictional contact with the wall of the receptacle 1 to prevent accidental displacement of the disk during the use of the device. The disk 5 forms a closure for the opening 4 and also acts as a thermostat and may be constructed from any material suitable for the purpose which is susceptible to expansion and contraction from heat. The thermostatic disk is adapted to permit the steam or vapor to escape from the chamber 3 when it reaches a predetermined pressure or when the fluid therein reaches a predetermined temperature.

In Figure 4 of the drawings, the disk clearly is illustrated acting as a thermostat and showing in dotted lines the latter expanded or flexed due to heat to permit the escape of steam or vapor from the chamber 3 by way of the opening 4.

The inner receptacle 2 may be provided with a plurality of tubes 7 to permit the free circulation of vapor or steam to and about the walls of the same and the inner receptacle has a passage 8 therethrough and connected with tubular portions 9 secured to the receptacle 1 or may be formed integrally therewith if desired. Air, gas or any fluid or material may be passed through the passage or chamber 8 by way of the tubular portions 9 to thoroughly heat the same by contacting with the walls of the chamber 8 and to retard the flow of the air, gas or fluid through the inner receptacle, a fan 10 may be provided and is journaled in suitable supports 11. The device as shown in Figure 1 may be used for many purposes, as for instance may be employed for heating air, gas, or fuel for internal combustion engines, and if desired any other materials to be heated may be passed through this device by any suitable means.

Referring to Figure 5 of the drawings, inner and outer receptacles 12 and 13 are connected together at their upper edges to form the air-tight chamber 13 and the outer receptacle 13 has an opening 15 closed by a disk 16 similar to the disk 5 in the form of invention shown in Figure 1. The inner receptacle 12 has its side and bottom walls spaced from the walls of the outer receptacle to permit steam or vapor to freely circulate within the chamber 14 and about the walls of the inner receptacle. The inner and outer receptacles may be constructed from any material suitable for the purpose and have their upper edges curved to form a retaining flange 17 to receive a suitable cover (not shown) whereby food stuffs and other material may be heated within the inner receptacle.

While I have shown and described the preferred embodiment of my invention, it will be understood that minor changes in construction, combination and arrangement of parts may be made without departing from the spirit and scope of the invention as claimed.

Having thus described the invention, what I claim is:

1. A heat distributor comprising a heated receptacle, a second receptacle within and associated with the first receptacle and adapted to have fluid between said receptacles to cast off vapor or steam to evenly heat the walls of the second receptacle, a thermostatic disk to permit the steam or vapor to escape at a predetermined pressure or temperature and provide means to allow the fluid to be placed between the receptacles.

2. A heat distributor comprising a heated receptacle, a second receptacle within and associated with the first receptacle and adapted to have fluid between said receptacles to cast off vapor or steam to evenly heat the walls of the second receptacle, a thermostatic disk pivotally mounted on the outer receptacle to permit steam or vapor to escape at a predetermined pressure or temperature and provide means to allow the fluid to be placed between the receptacles.

3. A heat distributor comprising a heated receptacle having an opening, a second receptacle within and associated with the first receptacle and adapted to have fluid positioned between said receptacles by way of the opening to cast off vapor or steam to evenly heat the walls of the second receptacle, a thermostatic disk pivoted to the outer receptacle and overlying the opening to permit steam or vapor to escape therefrom at a predetermined pressure or temperature and provide means to allow the fluid to be placed between the receptacles.

4. A heat distributor comprising inner and outer receptacles having an air-tight chamber between the same, said chamber extending also between the end walls of said receptacles, means for admitting fluid to said chamber and to permit the escape of steam or vapor from said chamber at a predetermined temperature or pressure, tubes extending through the inner receptacle, said inner receptacle having a passage therethrough.

5. A heat distributor comprising inner and outer receptacles having an air-tight chamber between the same, said chamber extending also between the end walls of said receptacles, means for admitting fluid to said chamber and to permit the escape of steam or vapor therefrom at a predetermined temperature or pressure, the said inner receptacle having a plurality of passages, some of said passages having communication with the interior of the outer receptacle and one of the passages having communication with the exterior of the outer receptacle to form a passage to permit gas or fluid to pass through said receptacles, and a retarding means in said last named passage.

In testimony whereof I affix my signature.

WARREN M. PIGGOTT.